R. N. Eagle,
Animal Shackle,
No. 2,514. Reissued Mar. 19, 1867.
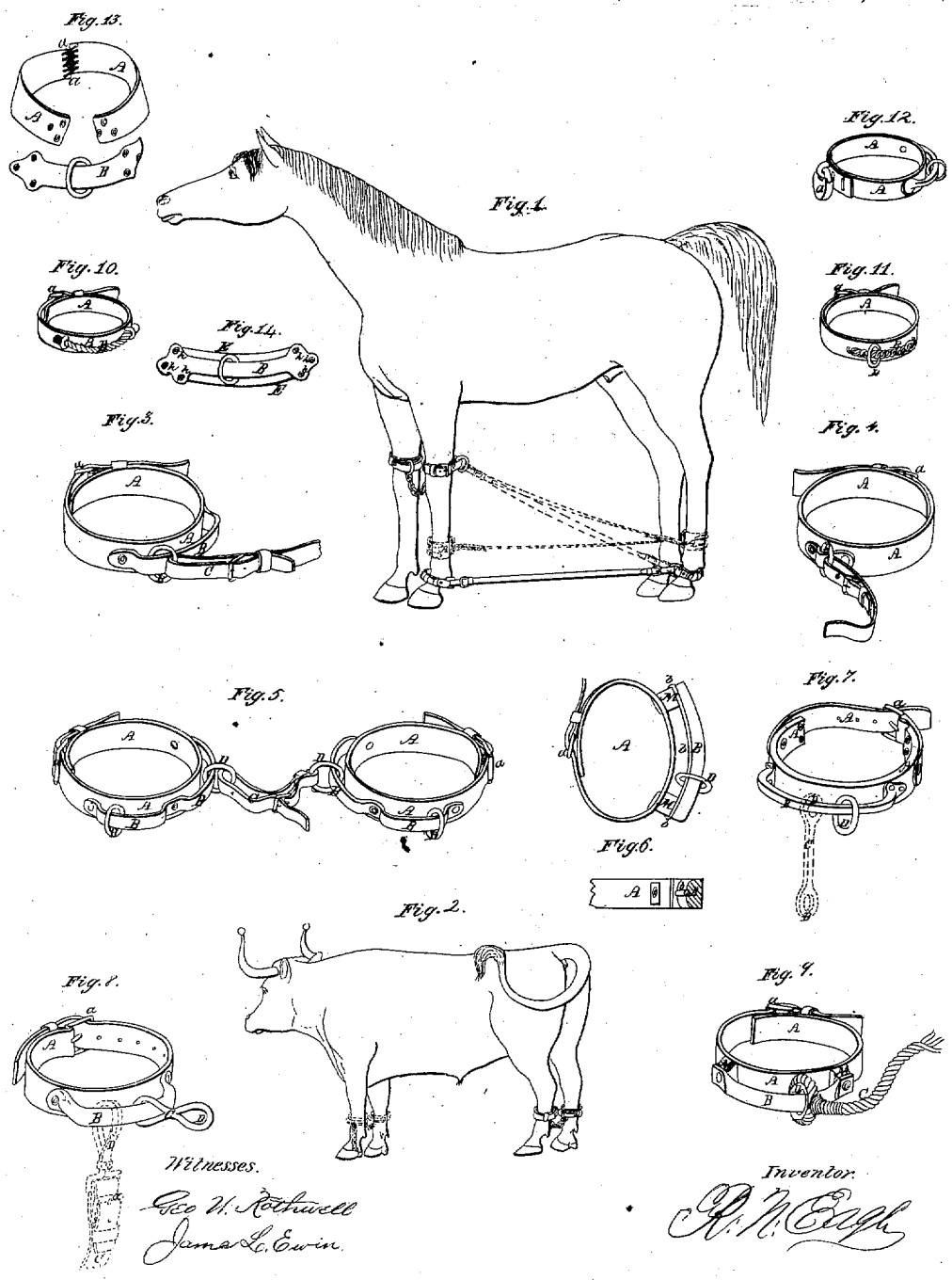
Witnesses.
Geo. H. Rothwell
James L. Ewin.
Inventor.
R. N. Eagle
N. PETERS, PHOTO-LITHOGRAPHER, WASHINGTON, D. C.

United States Patent Office.

ROBERT NELSON EAGLE, OF WASHINGTON, DISTRICT OF COLUMBIA.

*Letters Patent No.* 38,100, *dated April* 7, 1863; *reissue No.* 2,514, *dated March* 19, 1867.

IMPROVEMENTS IN FETTERS AND HOPPLES.

The Schedule referred to in these Letters Patent and making part of the same.

TO ALL WHOM IT MAY CONCERN:

Be it known that I, ROBERT NELSON EAGLE, of the city and county of Washington, in the District of Columbia, have invented certain new and useful Improvements in the Construction of Hopples for Fettering, Side-Lining, and Connecting Horses, Mules, Horned Cattle, and other Animals; and I do hereby declare the following to be a full, clear, and exact description thereof, reference being had to the accompanying drawings, making part of this specification, in which—

Figure 1 illustrates the leading features of construction and ordinary modes of application of my improved hopple as adapted for use in limiting the motions and steps of a single animal by means of fettering or hoppling two or more legs at the same time. The term "single" or "set" being applied in this specification as respectively descriptive, the former of hopples which may consist of two leg-bands only, and the latter of those which consist of three or more leg-bands.

In fig. 1 an animal is represented as fettered in two ways, viz, above the knees, with hopples similar to those shown in fig. 5, or at the fetlocks of a fore and hind leg, (commonly called side-lining,) with hopples similar to the type shown in fig. 3. These modes are effective, separately or conjointly.

The terminals D of the coupling C, in both cases, consist of rings, which are allowed space for their horizontal or nearly horizontal motion upon the leg-bands A.

In blue lines, fig. 1, and designated by letters A A, is shown a modification of my side-lining hopple, the sliding rings D of the coupling C having in this instance the vertical play or motion also peculiar to my present improvement, caused by the vertical position given to the straps or bars B upon their respective leg-bands.

In red and blue lines, same figure, (1,) are shown other ways of side-lining and fettering an animal at the same time, for which purpose a "set" composed of three or more leg-bands, A, with the required number of couplings, C, are necessary to form a complete hopple.

The animal being fettered above the knees with a pair of my "single" hopples, as shown in the illustration, the strap C, in red lines, connects the near hind leg at a point below the fetlock, to the near fore leg above the knee; and in blue lines, the near hind leg at a point above the fetlock to the near fore leg above the knee, the bars or straps B being differently placed on the fore and hind-leg bands, respectively, in order that the terminals of the coupling C may each have a different movement thereon, for reasons which will hereinafter be explained.

Figure 2 illustrates, in black lines, another mode of applying a pair of my "single hopples" to one animal, also the application of a "set of hopples" to two or more animals, as shown in red.

Figures 3 and 4. The former represents the half part of a pair of "single hopples" constructed on my improved plan; that is to say, one leg-band with a portion of the coupling thereto attached, by comparing which with the half of a differently constructed pair, as shown in fig. 4, the spirit of my invention will be readily understood.

In the latter figure, (4,) which illustrates the plan hitherto pursued in the construction of hopples and side-lines, (the only difference being the length of the connecting strap, which was longest for the side line,) it will be seen that the coupling C is secured at each of its ends, respectively, to a fixed or specific point of junction with the leg-bands A; whereas in the former figure (3) the terminals D of the connecting strap C are allowed freedom to move backward and forward, or slide upon the bands A in a lateral or horizontal direction, presenting in this respect a very material difference in the construction of figs. 3 and 4.

Figure 5 represents two leg-bands, A, constructed for use as a "single hopple," or in conjunction with one or more additional leg-bands, A, to form a "set" of hopples, as already explained in my description of fig. 1, as well as for economy's sake, in the event of either of the bars B wearing out or breaking, to afford a hopple, which, having two or more straps or bars B upon each leg-band, furnished with the terminals D or their equivalents, will constitute two distinct working sets of hopples in one and the same appendage; this arrangement of two or more straps or bars, B, upon one and the same leg-band, being as applicable for "sets" of hopples or fetters as for "single" and "side hopples."

Other figures, illustrating various modifications, more particularly in the construction and arrangement of the various parts of my improved hopple, will be referred to hereinafter.

In the various figures like parts are indicated by the same letters of reference.

My invention relates to that class of hopples or fetters for animals, and gyves for men, which are provided with two or more leg-bands, and one or more connecting straps, cords, or rods from one leg-band to another.

The principal object of my improvement is to partially or entirely relieve the band A from a tendency to slip or turn, when the animal is in motion, by affording to one or more of the terminals of the coupling C, motion upon or relatively to the leg-bands, in the direction in which it is drawn by said motion. The bands A, straps or bars B, coupling C, and its rings D, or their equivalents, form the main features of a set or pair of my improved hopples adapted to fetter the fore or hind legs of animals, or, by slight modifications in construction, to connect a fore and hind leg together, or to fetter and side-line at the same time.

These hopples are especially designed for attachment above the knees, which mode not only possesses novelty of position, as compared with the manner of applying hopples heretofore to animals, but various advantages by reason of this position, which hereinafter will be more particularly referred to.

Without attempting to anticipate all the details of construction, or to enumerate the various materials suitable for their manufacture, I will notice some of the varieties of this hopple which I propose to construct, viz:

1, for temporary wear, while the animal is grazing.

2, for permanent attachment, day and night, requiring a differently constructed article from that first spoken of.

3, for gentling young animals, and accustoming them to sights, noises, &c.

4, for subduing the vicious and restive, for which purpose fetters will now and then be applied, both at the fetlocks and above the knees.

5, for training and gaiting purposes, in which different limbs of the animal will require various degrees of constraint at the same moment.

6, for restraining breachers and jumpers.

7 and 8. The former, for securing fine and valuable stock in open pasture and prairie, will be preferably constructed of steel or other metal throughout, encased in leather, and padlocked on, (see Figure 12,) while the latter may consist of a cheap and easily gotten up style (see Figure 10) for the herding of the comparatively worthless Indian pony or mustang.

9 and 10 may be those which differ, by reason of their lightness, neatness, and ease of adjustability to the legs, from others which are heavy and strong enough to hold an ox. The former, adapted for street and city use, in lieu of hitching at a post, may have the straps or bars, B, of leather, highly ornamented, or of metal, silver plated or japanned, to prevent rust; or the entire hopple may be composed of light chain-web for the bands A, and a different article of chain for the bars B and coupling C, with clasps instead of buckles, *a*, for ready attachment.

Other and cheaper styles, not yet enumerated, will be better adapted for the far West and farm purposes generally, or for herding and driving tired stock, day after day, on long journeys.

Varied as the uses are to which this hopple may be applied, the principle herein claimed is nevertheless that which is required, not only to render each class operative, but at the same time remove the objectionable feature heretofore existing in hopples and fetters, and which is the aim of my present improvement. And although one style may differ relatively from another in lightness, strength, finish, or materials used in construction, and different limbs of an animal be brought under restraint at one and the same moment, by fetters expressly constructed for the purpose, the principal features of adaptability and advantage which either style or class may present, will, after all, hinge upon this point, viz, that the terminals D or ends of the coupling C are allowed the play or motion upon the leg-band A in the required direction, instead of the terminals of the device C, which connects one leg-band to another, being applied as heretofore at a specific or positive point of juncture with the latter.

In order that others skilled in the art to which my invention appertains may be enabled fully to understand and use the same, I will proceed to describe the principal features of construction, with some of the more popular modes of application.

*Of the Band A.*

A is a leg-band, provided with the buckle or other fastening, *a*, adapted to be secured upon either leg of an animal. The said band may be composed of one or more pieces and thicknesses of any suitable material, according to the use and market for which the hopple is intended; as of one or more thicknesses of leather, (see figs. 5 and 6,) or of one or more thicknesses of wood, or of leather and wood combined, (see Figure 7,) hinges or elastic joints being properly introduced at or near the centre of the band A, when iron or inflexible material is used; or in lieu of these elastic joints or hinges, a section of the band may be cut away, as shown in fig. 7, to form an opening to admit the animal's leg. The band A may be composed of curb or other flat chain, or of band iron or steel, (see fig. 12,) covered with cloth, leather, or other suitably soft material, proof against rust; or of twisted, plaited, or woven fibrous material; or of rubber, felt, or raw hide, &c., and which may be secured upon the leg of an animal requiring restraint, either above the knee or gambrel joint, or above or below the fetlock, by tying, (see Figure 13,) buttoning, or by staple and padlock, (fig. 12,) or by hooks or clasps taking into links of a chain connecting the ends of the band; the latter in no event fitting so tightly as to impede circulation or muscular motion, but merely close enough to prevent its slipping down of its own weight over the joint next below it of the leg.

A modification of the foregoing described leg-band A will be understood by referring to fig. 13, which represents a partial or incomplete leg-band, composed of two or more pieces of any suitable material, circularly bent, cast or cut into the shape desired, and then applied or attached to the ends of the bar B, (which latter is shown as part of the same figure,) instead of continuing on in one piece or uninterrupted circle beneath the said bar B, as shown in other types of my improvement; the bar B thus serving to connect the circle, and complete the leg-band A.

In this mode of construction the bar B will be of sufficient strength to stiffen and support the attached ends of the short or sectional leg-band pieces, as well as to withstand the necessary strain of the fastening device *a*, or that of the coupling C. The band A may be flat, or convex on one or both sides, to prevent chafing; or, if occasion require, padded or lined for further security against abrasion, or be furnished with puffs and rolls to fill up inequalities in the leg and equalize pressure. Moreover, it may be curved or bent to suit the form of the leg before the strap or bar B is secured to it, so that it shall not become disturbed or flattened and exercise unequal pressure upon the leg.

Any desired number of the bands A may be applied to one and the same leg, and any required number of the legs of an animal have the same applied thereto; or the said bands A may be applied in use to other parts, as well as to the legs of different animals.

*Of the Strap or Bar B, and its Movable Attachment D.*

B is a strap or bar of any suitable material, formed upon or applied in such a manner to the band A as to leave space between the said bar and leg-band sufficient for the free and unobstructed traverse of a sliding or movable ring, loop, or other terminal device D, of strength and dimensions sufficient to keep two or more of the already described leg-bands A connected, and thereby arrest the step of the animal, the said sliding loop D, or its equivalent, being passed, in some cases, over the bar B, before the latter is secured to the band A; or, as will presently be shown, the said loop D may not form part of the bar B at all, but become a terminal of the coupling C, (to be spoken of hereafter,) without impairing its usefulness as a movable agency of connection between the several leg-bands A.

In the construction of the strap or bar B, a variety of rigid or flexible materials will be found suitable, such as rawhide, plaited or twisted wire, cord or twine, stout thongs or straps of leather, rubber tubing, chain, rope, wood, iron, steel, etc., etc.

In figs. 3 and 5 the strap or bar B is represented as of sole leather, riveted directly to the band A without the intervention of blocks, M, elsewhere referred to. In the plan and section, Figure 6, the strap or bar B is represented as of wood, of one or more thicknesses, bent or cut into shape, and supported at each end to a proper distance from the leg-bands by blocks, M, through which, also, the rivets may pass. A strip of metal, or stout wire-rod, *b*, is secured along the inner or concave side of the said bar B, against which the movable attachment, D, or its equivalent, (represented in some cases by the ring D of the connecting device C,) will come in contact, thereby increasing the strength of the said strap or bar B, and preventing the wood from wearing too rapidly or becoming uneven under the action of the ring D.

The application of the strip *b* is also proper when the said bar B is composed of leather or other flexible material.

In fig. 7 the bar or strap B is of metal, riveted to the wood portion of the band A, no blocks, M, intervening, as elsewhere shown, between the bar and leg-band, the bar being so curved as to dispense with this necessity.

In Figure 8 the bar B is of metal, riveted at its ends to the band A, while in Figure 9 blocks, M, of wood, leather, or other material interpose between the leg-band and bar B, the latter being so straight or slightly curved as to render the use of the blocks necessary in preserving the required space between the two for the sliding of the terminal D.

When the softer kinds of metals or materials are used in the construction of the straps or bars B, a plate of wrought iron, steel, or other suitable strengthening material, may extend from one end of the said bar B to the other end of the same, and be attached or applied as are the blocks M just spoken of; this feature of construction being desirable to support the said strap or bar, and prevent it from bending or breaking too readily when the strain of the connecting device C (to be presently spoken of) comes upon its centre.

In Figure 10 the bar B is shown of rope, with its ends passed through staples riveted to the band A, or through rings stapled to the said band A, which ends are then served or wound with tarred yarns, waxed ends, or ferruled to prevent them from being pulled back through the staples or rings, or the staples may be dispensed with altogether, and the ends of the rope, after being knotted, may be simply secured to the leg-band by sewing or otherwise.

In Figure 11 the bar B is shown of curb or other suitable chain, passed through the terminals D previous to its ends being linked to staples riveted to the band A.

In fig. 12 the bar B is represented as of iron or steel, riveted to the iron or steel leg-band A; although where metal (especially cast or malleable) is used in constructing hopples or gyves, it will answer, if not be preferable for some purposes, that the bar B should be cast upon or form part of the leg-band A.

The bar B may be constructed, as shown in Figure 14, of metal, cast or wrought, or of wood, or other suitable material, with the feet or ends of the bar resting upon a supporting brace or strip, E, cast upon or applied to the said bar B, space being allowed between the two for the traversing loop or terminal D.

In this manner the bar B forms, as it were, a section of the leg-band A, to which it may be applied or attached in any suitable manner, as by riveting at the holes *h h*, and a practical saving of material thus effected, as shorter pieces, for instance of leather, may be used to connect the ends of the bar B with the fastening device *a*, than where the leg-band is composed of one entire piece. Otherwise the strap or bar B may be composed of hemp, hair, or other fibrous material, woven, plaited, or wrought in any suitable manner; or be of rope, woven, plaited, or spliced in with the material of the leg-band A; such modes of construction being especially adapted for rural districts, where a light and easily fabricated article would be preferred, owing to the services of a mechanic not always being available to repair and construct.

In the selection of materials for constructing the bar B, or its equivalent, I sometimes employ, as already described, leather or other flexible material, the leg or part of the animal to which the said band is applied having the effect to stretch or keep it extended sufficiently to permit the facile movement of the traversing terminal D; whereas, under different circumstances, it will be found, as for continuous use, that the stiffer and harder the said bar is, the better its shape and smoothness will be preserved under the action of the terminal D.

The strap or bar B may be of any desired width, or varied in length and curvature to suit the shape, size, breadth, or diameter of the forearm, hock, fetlock, or other points or parts of an animal to which the hopple may be applied. Or the strap or bar B may extend far enough around the leg-band proper to give freedom to the movement of the terminals D of the connecting device C, (or the movable band upon the bar B,) on an animal of any size, thus representing in appearance an upper or outer leg-band B, secured to the lower or main leg-band A; the former or outer band, from its looseness, having the capacity to adjust or subdivide itself into a strap or bar, B, of various lengths and degrees of curvature, according to the shape and size of the limb, and action of the terminals D of the connecting device C. In any event the space between the strap or bar B and leg-band A should be sufficient to permit the ring D, or whatever terminal device may be used, to slide freely along the bar or strap B, so as not to create a cause for or to impart a tendency to the said leg-band to "hoist," turn, or move upon or around the leg by becoming jammed between the two.

The ends of the strap or bar B, where they come in contact with the leg-band A, and also the buckle or other fastening device, *a*, may be curved to suit the shape or oval of the band as it will be when applied in use.

Any desired number of the straps or bars B may be applied to one and the same leg-band; either running parallel with the said leg-band, (see figs. 7, 8, &c.,) or perpendicular thereto, (see blue lines in fig. 1,) or in any other required direction, either in reference to the bars themselves or with the leg-bands A. The bar B, as already shown, may be arched or constructed straight, or bent in any horizontal or vertical direction, and be formed and applied in sections of lengths, (see fig. 5,) as well as in one length of bar, (as shown in several figures,) and be placed anywhere upon the band A, and be secured to the same in the modes described, or in any other manner suitable for the purpose.

Having thus described the leg-band A, with the strap or bar B thereto applied or belonging, and the ring or terminal D, which, according to construction, may belong either to the bar B or to the coupling C, there only now remains to be described the device or devices C, which shall connect two or more of the said parts or bands in order to complete a fetter or hopple conforming to the principle of my present improvement.

*Of the Coupling C, and its Terminals, D D, or Movable Sliding Bands upon the Bars or Straps B.*

C, in the several figures, represents the coupling, strap, chain, or rod, which, with its terminals, D, or their equivalent, connect such portions of the appendage as have already been described, viz, the leg-bands A, with bars B, or their equivalents, thereto applied or belonging.

The coupling C may consist of chain, rope, strap, or thong of leather, wood, rod iron or steel, or other flexible or rigid material, and, with its terminals D, be of any design or material adapted to correspond in weight, strength, and cost of material with that which composes the other portions of the hopple, as regulated by the market, use, and locality, upon the animal for which the article may be intended.

The strap or rod C may connect together and operate upon or with the leg-bands A, or any appendage thereof, as well by means of its own terminals, D, as through the agency of the sliding or movable bands or rings upon the bars B, or may as effectively work without the necessity of rings upon its own ends, or upon the bars B; as, for instance, by means of spring clips, hooks, or "S" links, temporarily attached to or applied at its own ends or upon the bars B, (see fig. 8,) and so constructed as to be applied and removed at pleasure; or otherwise, by the said strap or bar C being doubled or turned at its own extremities into loops D D, or having its ends furnished with fastenings to afford adjustable sliding loops or bands for the bars B, care being taken that the diameter of the sliding device D be sufficient to allow of its easy passage hither and thither upon the strap or bar B, (wherever the latter may be located on the leg-band,) while the animal is in motion.

The coupling C may be made adjustable, and its terminals, D, be composed of the same or of different material, and may or may not form part of the same; or the said coupling may be arranged in fixed lengths of one or more loops or rods to each length, in order to secure still greater flexibility.

When the coupling C is composed of rigid or inflexible material, such as metal, wood, &c., it may connect the leg-bands together, either as shown in black lines, (fig. 8,) or in red lines, (fig. 7,) by the strap or bar B, of the leg-band A, being passed through eyes in the ends of the coupling C, before the former are secured to the leg-bands, or by the said straps or bars B being clasped by hooks formed upon the ends of the band C; or, otherwise, by means of terminal rings loosely playing on the ends of the coupling C, thereby forming intermediate joints between the strap or bar B of the leg-band and the connecting-rod or band itself. Or the connecting-rod C may be jointed or hinged at one or more points or places of its length, to render it still more self-adjusting to the motions of the animal.

In fig. 9 is shown a modification of the coupling C and its terminals, D, which consists of rope with an eye turned around a thimble, which may be passed over the bar B, before or after the latter has been secured to the leg-band.

Any desired number of the sliding or working terminals D may be applied to one and the same coupling C, or any desired number of their equivalents be applied to the same strap or bar B; or the said terminals D may be so constructed as to work in a slot in any one of the bars B of a leg-band, or work upon adjacent bars, in which latter case the terminals D may be represented by curved grapnel claws or hooks, back to back, working or sliding simultaneously upon the said parallel bars B B.

In addition to the terminal devices D of the coupling C, it will be necessary for some purposes to attach staples or rings (as shown in fig. 4) at fixed points along the leg-bands A, sometimes at the rear of the fore-leg bands and front of the rear-leg bands, and sometimes on one or more of the sides of the same, or both; and hence I do not restrict myself as to the number or position of these fixed staples or rings, whether upon the fore or hind-leg hopples.

Fig. 1 represents a type of my single hopple for grazing purposes, consisting of two of the before-described leg-bands A, which are preferably applied for this purpose to the fore legs of an animal above the knees, the coupling C and its terminals D D being represented by a chain and rings, with the bars or straps B B facing each other, and the buckle or fastening devices *a a* on the outer or further side of the leg-band, which are the relative positions of the parts of my single hopple when applied in use to one animal.

The same figure (1) illustrates, by red and blue lines, two methods of applying a set of my side-lining hopples, consisting in both instances of three or more leg-bands, A, which are used in conjunction for coupling the fore legs with a near or off hind leg.

A modification of the same is shown in black, (same figure,) where single fetters are applied to the fore legs above the knees, and side-lining hopples from the fetlock of the fore to the fetlock of the hind leg, whereby the same object is effected, although in a different way, there being in the latter case no conjunction between the leg-bands A of the single fetters and those of the side-lining set.

The single hopple shown in fig. 5 is designed, as already stated, with especial reference to its use in conjunction with a third leg-band, A, to form or complete a full set of one of my improved hopples.

Fig. 2 shows the application of my fettering hopple to oxen and other horned cattle, it being placed upon the hind legs in preference, when the hopple is for permanent use, owing to a peculiarity in the disposition of the limbs of an ox or cow in lying down, resting, or rising to its feet, although for temporary or grazing purposes it may be applied to the fore legs of such animals, and as well above as below the knees.

When it is necessary to secure two or more animals together, they may be attached to each other by a pair of single hopples connecting them by the near and off legs, or they may one or both be separately hoppled and then connected as shown in red, same figure, (2,) the chain on the outer side of the leg-band A being the medium of attachment of the near and off legs of the different animals. Thus there is a conjunction formed between four of the leg-bands A.

In fig. 4, which illustrates the principle, or, rather, want of all mechanical principle, in fetters and hopples heretofore in use, the defects of the old-fashioned plan of construction will at once be apparent, inasmuch as any lateral strain upon the terminals or extremities of the coupling device must, as a consequence, cause each leg-band, in its turn, to shift or move upon the legs as the feet are alternately advanced, owing to the said terminals contacting with and remaining at a fixed point of juncture with the embracing portion of the hopple, instead of (as represented in fig. 3) being allowed latitude or lateral play nearly equal to or corresponding with the measured space or distance between the front and rear points or termini of the animal's legs, and which is required to permit the unobstructed passage of the legs (to the limits of the connecting strap C) without turning or slipping the bands A A upon or around the same.

It will thus be understood that the functions or offices of the bars B B and the coupling C are essentially different, although in a manner depending on each other for harmonious operation.

For instance, the coupling C regulates, according to its length, the length of the stride or step of the animal, and yet when aided by its terminals, D D, in freely traversing or playing along the bars B B, will permit the alternate step being taken without fear of any circumferential movement of the leg-bands upon the legs, however violent the forward step may be taken, and hence to this introduction of a principle hitherto unknown or overlooked in the construction of hopples and fetters for the limbs of man and beast is owing the fact that those of my construction are the only hopples of which I have any knowledge that will or can remain above the knees of a grazing animal, though buckled or otherwise only loosely fastened on, for days and nights together, and without galling or abrading the skin.

In like manner the application of the same principle to the construction of a "side-line" or side hopple will be apparent, by reference to fig. 1 (red and blue lines) which represents the bar B on both fore and hind leg, as applied to the leg-bands in a vertical or nearly vertical direction with reference to the latter, in order to counteract the slipping up and down or hoisting of the bands upon the legs, as the feet are lifted and lowered in advancing, the said bands A being of any desired width to correspond with the length or span of the bars B.

It is well known that in the old form of hopples and side-lines, both terminals of the connecting strap turned at the point of their connection with the leg-bands as upon a pivot, and hence any indirect strain upon the said leg-bands necessarily tended to impart circumferential motion thereto, whereas such tendency to circumferential motion is entirely removed by my plan of causing the point of attachment between the coupling and leg-band, instead of being stationary or confined in position, to have freedom to move, slide, or oscillate, as it were, backward and forward upon the latter at every motion of the animal's legs, so that the final strain by which his motion is arrested is applied in a line radial, or nearly radial, to the leg-bands.

Among other advantages claimed for my improved hopple, aside from the one of obviating friction, may be chiefly mentioned that of position on the legs of the animal.

1. Owing to the superiority of a fetter for grazing purposes which will remain above the knees and elevate the coupling C beyond the reach of objects which otherwise would interfere with the progress or movements of the animal in rough feeding grounds, as formerly was the case where the hopples were applied at the feet.

2. In consequence of the increased power obtained over the limbs of the animal, familiarly but clearly conveyed to the understanding by citing the advantage of a wrestler whose opponent is seized above or at the elbows instead of at the wrist.

3. From the advantage this position offers in reducing the liability of an animal straining himself under the effects of fright or violently attempting locomotion, owing to the constraint being applied near the shoulder or hip instead of at the feet or termini of the limbs.

4. On the score of economy, as the labor and expense of lining, padding, or stuffing such portions of the hopple as come in contact with the hide or skin of the animal, and which heretofore was a necessity, may thus be safely dispensed with.

Having thus described my invention, the following is what I claim as new therein, and desire to secure by Letters Patent:

1. I claim the devices, substantially as described, for connecting the legs of an animal by a coupling whose mode of junction with the leg-bands relieves the said leg-bands of motion upon the leg, wholly or in part.

2. I claim a bar or strap, B, or its equivalent, as a means of connecting the coupling C with the portion A embracing the leg, substantially as described and represented.

Witnesses:

JAMES L. EWIN,

GEO. W. ROTHWELL.

R. N. EAGLE.